Patented Aug. 22, 1944

2,356,299

UNITED STATES PATENT OFFICE 2,356,299

PROCESS AND PRODUCT FOR OVERCOMING THE CRYPTOGAMIC DISEASES OF PLANTS

Henri Bernat, Bordeaux, France; vested in the Alien Property Custodian

No Drawing. Application February 10, 1942, Serial No. 430,304. In France February 24, 1941

3 Claims. (Cl. 167—16)

It is known to use cupra ammonia for overcoming the crytogamic diseases of plants. The said process has been unsatisfactory because the copper sprayed upon the parts to be protected is removed by rain and dew, so that the length of efficiency of the cupra ammonia is rather restricted.

On the other hand it is known that cupra ammonia dissolves cellulose.

The present invention is based upon the use of the said last feature for preventing the removal of copper by rain and dew.

The present invention has for its object a product for overcoming the crytogamic diseases of plants, which is constituted by a mixture of cupra ammonia and of an adhesive material and particularly by a solution of cellulose in cupra ammonia, the said dissolution being advantageously additioned with colloidal, plastic, adhesive or viscous elements.

In order to obtain the said cellulosic solution, cellulose is introduced in the ammonide, the said cellulose is dissolved, thus obtaining a liquid which is more or less thick according to the amount of cellulose being added. The solution of the cellulose is facilitated by grinding.

As colloids or plastic materials colloidal clay can be mentioned, the said clay being sufficiently ground for remaining suspended in the liquid to be sprayed, such materials being for instance kaolin, kieselguhr which further have the advantage of leaving if necessary after addition of a dye, upon the leaves visible traces which enable one to control the amount and the rate of the treatment.

In order to obtain a given viscosity, fat materials and particularly a small proportion of rosin oil can be used, the said materials remaining incorporated in the cupra ammonia in the form of ammonia soap.

When the said product is to be used, be it in the form of paste or of a liquid, it is mixed with more or less great amount of water, according to the copper content desired for the liquid to be sprayed. It will be noted that the cellulose is suspended in the form of very light flakes. The said flakes are very easily dispersed in a persistent way by stirring and will be sprayed on to the vegetal parts to be protected simultaneously with the liquid.

A short time after spraying, the ammonia, then the water evaporate and the copper adheres to the leaf, under various combinations. The cellulose and the plastic materials (clay, etc.) form a kind of protective varnish or coating. The ammonia soap imparts a given viscosity the said coating and loses by evaporation most of the ammonia which it contains.

I claim:

1. A product for treating plants to overcome cryptogamic diseases comprising a solution of cellulose in cupra ammonia, said cellulose being present in an amount sufficient to facilitate adherence of the cupra ammonia to the plants treated, and a colloidal clay.

2. A product for treating plants to overcome crytogamic diseases comprising a solution of cellulose in cupra ammonia, said cellulose being present in an amount sufficient to facilitate adherence of the cupra ammonia to the plants treated, a colloidal clay and a small proportion of fatty acid capable of reacting with the ammonia to form ammonia soap.

3. A process for the treatment of plants to overcome crytogamic diseases comprising spraying the plants with a solution of cellulose in cupra ammonia, said cellulose being present in an amount sufficient to facilitate adherence of the cupra ammonia to the plants being sprayed.

HENRI BERNAT.